United States Patent [19]

Norris, Jr. et al.

[11] Patent Number: 4,729,156
[45] Date of Patent: Mar. 8, 1988

[54] METHOD OF CONVERTING VEHICLE BODY FROM HARDTOP TO CONVERTIBLE STRUCTURE

[75] Inventors: Frank W. Norris, Jr.; Ronald J. Benedict, both of Lima, Ohio; James G. Burgess, Burleson, Tex.; Gary L. Stewart, Lima, Ohio

[73] Assignee: Car Craft Co., Lima, Ohio

[21] Appl. No.: 899,032

[22] Filed: Aug. 21, 1986

[51] Int. Cl.[4] .............................................. B60R 27/00
[52] U.S. Cl. ................................ 29/401.1; 29/426.2; 29/428; 29/462; 296/30; 296/186; 296/204
[58] Field of Search ................ 29/401.1, 462, 412, 29/426.1, 426.2, 428; 296/188, 203, 204, 209, 186, 30

[56] References Cited

U.S. PATENT DOCUMENTS

| | | | |
|---|---|---|---|
| 3,110,518 | 11/1963 | Wessells, III | 296/204 |
| 4,030,772 | 6/1977 | Jacob et al. | 296/204 |
| 4,129,330 | 12/1978 | Schwuchow | 296/204 |
| 4,238,876 | 12/1980 | Monroe et al. | |
| 4,261,615 | 4/1981 | Deaver . | |
| 4,346,930 | 8/1982 | Northey . | |
| 4,457,555 | 7/1984 | Draper . | |
| 4,493,506 | 1/1985 | Alexander | 296/204 |
| 4,514,891 | 5/1985 | Draper . | |
| 4,557,519 | 12/1985 | Matsuura | 296/204 |
| 4,570,321 | 2/1986 | Draper . | |

FOREIGN PATENT DOCUMENTS 2080211 2/1982 United Kingdom ............... 296/209

Primary Examiner—Howard N. Goldberg
Assistant Examiner—Irene Graves Golabi
Attorney, Agent, or Firm—Pravel, Gambrell, Hewitt, Kimball & Krieger

[57] ABSTRACT

A method of converting a sedan hardtop automobile body to a convertible includes severing the hardtop roof panel of the automobile body by forming cuts along the front of the continuous roof panel at the windshield and along the bottom of the rear roof pillars. A pair of structural reinforcement beams are positioned on the bottom of the vehicle connecting the vehicle's engine cradle and the rear transverse support which normally carries the two independent wheels suspension systems. A truss develop loads from the longitudinal beams to the surface of the wheel well lining and to the front shock towers. Transverse structural reinforcement is provided to the vehicle unibody at a position between the engine cradle and the rear transverse member and on the upper surface of the automobile floor pan. The transverse structural member fastens through the floor pan of the vehicle to the longitudinal reinforcements under the vehicle. The continuous roof panel is replaced with a fabric-like folding top.

9 Claims, 8 Drawing Figures

METHOD OF CONVERTING VEHICLE BODY FROM HARDTOP TO CONVERTIBLE STRUCTURE

BACKGROUND OF THE INVENTION

The present invention relates to vehicle conversions and particularly the conversion of a hardtop sedan to a soft-top convertible. Many sedan type automobiles are supplied by the original manufacturer as hardtop automobiles only. A hardtop sedan vehicle provides a generally continuous roof panel which extends from the windshield of the vehicle rearwardly and connects to two rear roof pillars. The rear windshield of the vehicle then extends between the rear roof pillars, above the trunk of the vehicle, and below the continuous top. Side windows extend from the windshield to the rear roof pillars on each side of the vehicle as is well-known. For those automobile models which are not available as a convertible, a post-manufacture conversion can be a way of transforming the vehicle from a hardtop to a convertible construction.

If a vehicle is of a common traditional frame or chassis type construction, the roof can normally be removed with a saw or like tooling. Cosmetic body work then dresses the saw cut areas and a commercially available folding top mechanism manufactured of a steel frame and a fabric covering is added to the vehicle.

Many vehicles are now being manufactured of a frameless unibody construction which does not use the traditional underbody frame or chassis. Such a frame or chassis would normally support the four wheels, the shock absorbers, the engine, and the transmission. The vehicle body parts such as fenders, doors, floor pans, and the like would then be fastened to the chassis. With unibody construction, there is no such vehicle frame. The vehicle unibody typically has a front structural member known as an engine cradle to which the engine and transmission are structurally attached. In the rear of the vehicle, a transverse frame supports the shock absorbers and wheels. It is common to use unibody construction wherein the rear wheels are of an independent suspension in that each wheel functions independently of the other, with each having its own shock tower and strut assembly rather than the traditional rear axial.

With unibody construction, the roof carries an enormous structural load in that it connects to the car adjacent the engine cradle in the front and adjacent the rear transverse support for the shocks and wheels at the rear of the car.

This type construction presents significant problems in converting such a unibody type vehicle to a soft-top convertible. In removing the roof, significant structural integrity of the car is destroyed such as on the order of 50%–80% of the vehicle's body strength. Once the roof is cut away from such a unibody construction, the only support extending between the front wheels and rear wheels of the car is a very thin floor pan. The roof beams and pillars have been destroyed in removing the entire continuous roof panel from the vehicle.

Several of the traditional types of conversions of automobile vehicle bodies have been patented. The Northey patent, for example, entitled "Convertible Car And Method Of Making Same" issued Aug. 31, 1982 as U.S. Pat. No. 4,346,930. In that patent, a hard-roofed two-door Toyota sedan is made into a convertible by removing the hardtop from the car body at the level of the top of the doors. Longitudinal reinforcing tubes are welded into the rocker panels of the vehicle. Reinforcing plates are then welded to opposite sides of the car body at the inside and just above the floor between the rear wheel wells and the door posts. Reinforcing plates are also welded to the sides of the car body at the inside just above the floor immediately in front of the door opening on that side and a pivotal linkage is attached to opposite sides of the car body for operating a convertible top.

In the Draper patent, U.S. Pat. No. 4,457,555, entitled "Conversion Of Vehicles Bodies," a vehicle body of the convertible or targa type is formed by converting a hardtop vehicle body wherein a reinforcing structure is disposed within the passenger compartment and is fastened thereto to form a centrally extending structural channel member extending longitudinally within the passenger compartment and having forward and rear transverse portions fastened to the forward and rearward suspension supports of the body to transmit torsional and beaming loads imposed on the vehicle body by the ground engaging wheels.

The use of reinforcing members on the inside of the vehicle body can cause problems in that the beams can extend upwardly and restrict foot room, thus decreasing the passenger comfort level.

The Monroe et al. patent, U.S. Pat. No. 4,238,876 entitled "Method For Converting Hard Top Vehicles To Removable Top Vehicles" uses a procedure whereby a vehicle which has been manufactured with a top of unitary construction with the body of the vehicle such as a sports pickup truck is converted to a removable hardtop vehicle. This patent relates primarily to the concept of retaining the hardtop, but converting it to a removable structure. The patent includes, however, a step of severing a predetermined portion of the roof of the vehicle from the body of the vehicle thereby exposing a cavity between inner and outer walls of the roof in the vehicle. The Monroe patent differs from the present invention in that a hardtop is thus available for structural integrity to the vehicle once it is reassembled to the vehicle. Further, pickup trucks typically use the traditional heavy frame or chassis construction which is unlike the vehicles converted by the present invention using a frameless, unibody construction having a forward engine cradle to carry the engine and transmission which is separated and spaced from the rear structural transverse frame which supports the rear wheels and shock absorbers.

Another patent relating to the method of converting a sedan or hardtop vehicle to a convertible is the Draper U.S. Pat. No. 4,514,891, entitled "Method Of Conversion Of Vehicle Bodies" issued May 7, 1985. In that patent, the method of converting a sedan passenger automobile includes adding a reinforcing structure having a channel member with inverted U-shaped cross-sections centrally and longitudinally within the interior of the body, fastening the channel member to the floor pan, adding a forward transverse reinforcing member within the interior of the body and fastening it to the channel member, to the floor pan, and to the forward suspension supports. Further, the method contemplates adding a rearward, transverse member to the interior of the body and fastening it to the channel member, to the floor pan and to the rear suspension supports. The continuous roof panel is cut and removed completely from the vehicle and is replaced with a detachable roof panel and a cutaway portion of the continuous panel.

The Deaver patent shows a "Convertible Top Structure And Method" which is U.S. Pat. No. 4,261,615. In that patent, a combined hardtop-soft top conversion structure and method for notchback coupes comprises the removal of rear side glass and rear window, removal of the vehicle just near of the "A" pillar and rear of the inner header structure, with the removal being complete from the top of the "B" pillars to the bottom of the "C" pillars; the attachment of a roll bar to the upper ends of the "B" pillars and gusset reinforcements to the rear of the "B" pillars; capping the roll bar, "B" pillar and gusset reinforcements with a molded plastic bow (sometimes referred to as a 'targa' bow); attachment of a folding convertible top to the rear of the 'targa' bow; attachment of a front roof support or header to the remaining front roof portion and inner header structure; and insertion of a removable hard roof or hatch support between the front roof support and the front of the 'targa' bow.

U.S. Pat. No. 4,570,321 issued Feb. 18, 1986 to David Draper and entitled "Conversion Of Vehicle Bodies" discloses a vehicle body of the convertible or targa type and the method of converting such a body from a sedan type vehicle body in which a reinforcing structure is disposed within the passenger compartment and is fastened thereto to form a centrally extending structural channel member extending longitudinally with the passenger compartment and having forward and rearward transverse portions fastened to the forward and rearward suspension supports of the body to transmit torsional and beaming loads imposed on the vehicle body by the ground engaging wheels.

As aforediscussed, these prior art patents do not relate to an independent four-wheel suspension, unibody type construction which does not use a traditional frame or chassis, but rather only provides a transverse frame at the rear of the vehicle for supporting the rear wheels and shock assemblies and a forward engine cradle for supporting the engine and transmission. The roof panel and pillars on such a vehicle typically supply the majority of longitudinal or fore and aft structural integrity to the vehicle where the roof carries beams and the pillars of the roof carry beams which connect in the rear to the rear transverse member (supporting the wheels and shocks) and in the front to the engine cradle (supporting the transmission and engine).

The use of unibody construction is desirable because it allows a very lightweight and fuel efficient vehicle to be constructed and yet still carry a full passenger load of, for example, five to six (5–6) adults.

SUMMARY OF THE PRESENT INVENTION

The present invention solves the problem of converting a unibody type sedan hardtop automobile to a convertible where the vehicle body has a forward structural engine cradle and a rear transverse shock and wheel carriage which are spaced longitudinally apart and connected above by the roof and below by a floor pan. The method of the present invention includes the steps of severing the hardtop roof panel from the automobile body by forming cuts along the front of the continuous roof panel at the windshield and along the bottom of the rear roof pillars. A pair of longitudinal structural reinforcement beams are positioned below the vehicle floor pan and extending longitudinally on each side of the vehicle between the engine cradle and the rear transverse support. A transverse structural reinforcement to the unibody and at the central portion of the vehicle between the engine cradle and the rear transverse support is attached to the upper surface of the automobile floor pan and extends transversely. A connection is formed to the two longitudinal reinforcements with the transverse structural reinforcement by welding, for example, after holes have been cut in the floor pan of the vehicle. Means is provided at the end of each of the longitudinal beams for forming a structural connection in the front to the engine cradle and in the rear to the transverse support. The cutaway roof panel is then replaced with a folding, fabric-like top. In the preferred embodiment, the longitudinal reinforcement beams extend diagonally above the vehicle rear wheel wells to form a connection with the rear transverse wheel assembly support.

In the preferred embodiment, the longitudinal beams form respective connections to the unibody adjacent the front respective wheel wells of the vehicle by using a pair of left and right reinforcing plate members attached respectively to the inside front wheel wells of the vehicle, penetrating the unibody of the vehicle at the wheel wells and forming a structural attachment by welding, for example, of the left and right longitudinal reinforcement beams with the reinforcing plate members.

In the preferred embodiment, the longitudinal structural reinforcement beams form connections with the vehicle unibody at the rear transverse wheel and shock member and preferably at a position above the plane defined by the floor pan of the automobile body. In the preferred embodiment, the longitudinal reinforcement beams are connected at intervals along their lengths with the floor pan by structural connections such as welding, for example. The vehicle's front shock towers are interconnected with a cross beam. Additionally, the longitudinal beams and front shock towers are connected with a wheel well positioned load transfer truss.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF A PREFERRED EMBODIMENT

Figure 1:
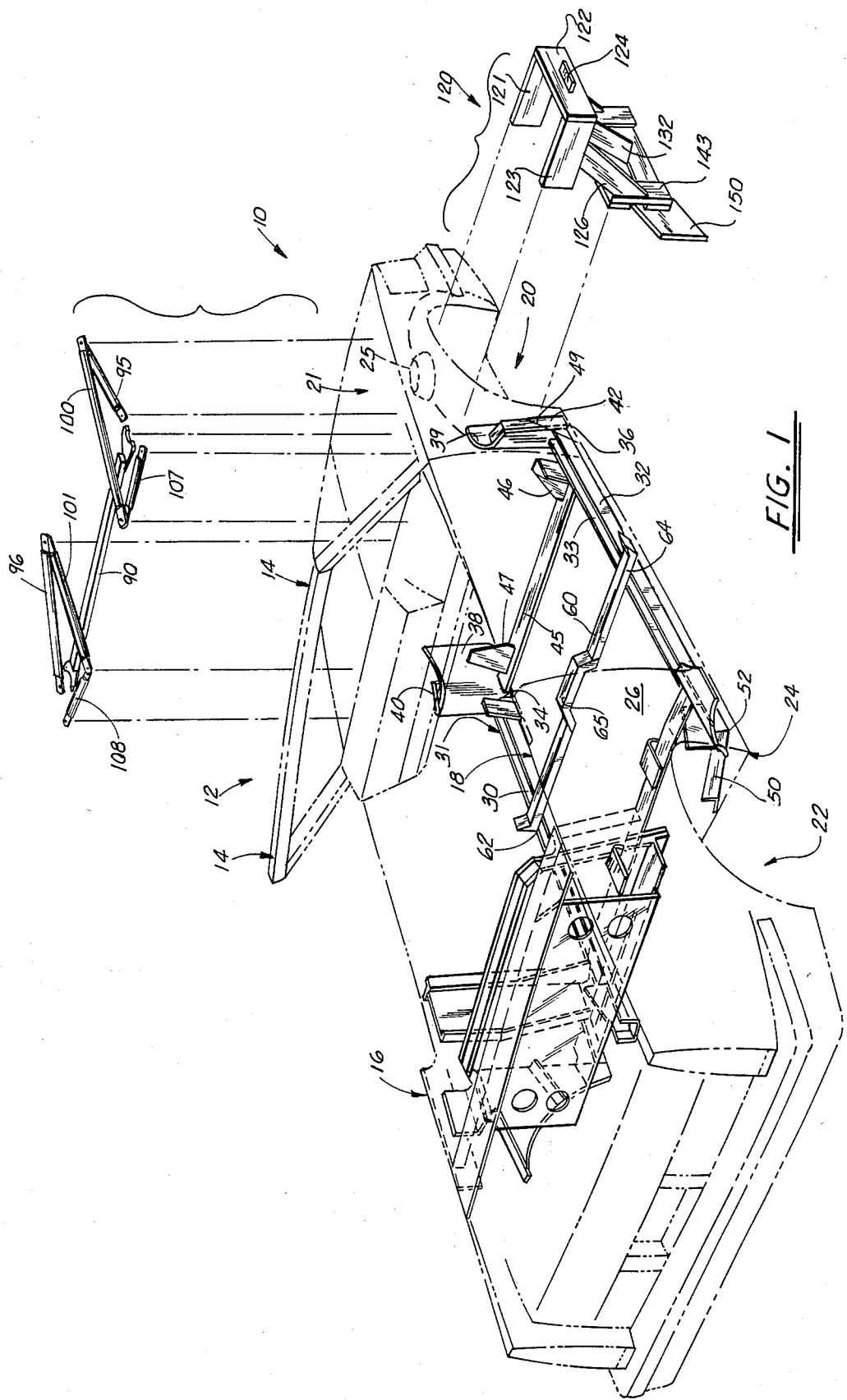
FIG. 1 is a perspective view of the preferred embodiment of the apparatus of the present invention illustrating the conversion method of the present invention.
Figure 2:
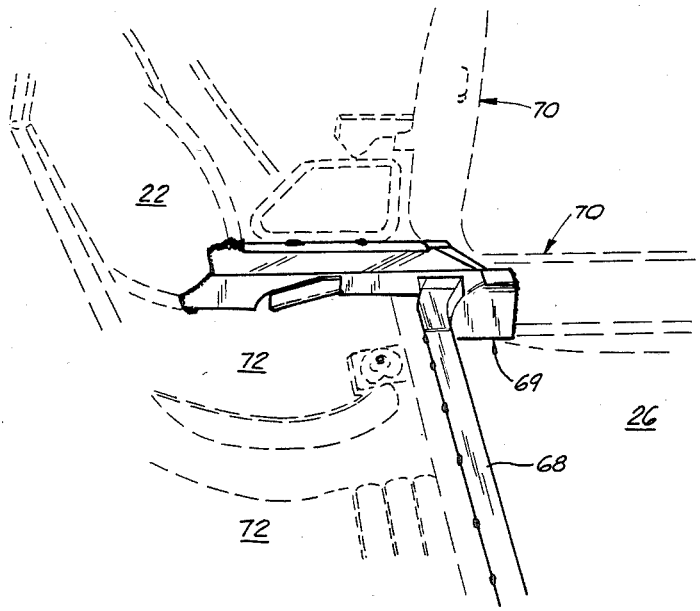
FIG. 2 is a perspective view of the preferred embodiment of the apparatus of the present invention illustrating the rear seat support portion thereof.
Figure 3:
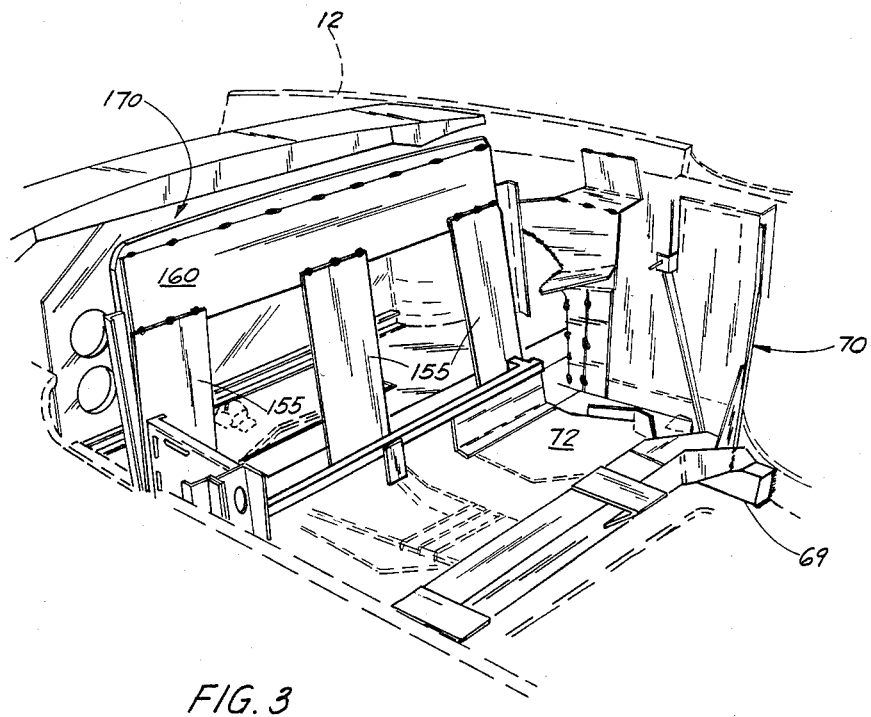
FIG. 3 is a perspective view of the transverse reinforcement portion of the method of the present invention.

FIGS. 1–3 illustrate generally the preferred method of the present invention. In FIG. 1, there can be seen an overall perspective view of a vehicle body designated generally by the numeral 10. A first step in the method of the present invention is to sever the hardtop roof panel from the automobile by forming cuts along the front of the continuous roof panel at the windshield 12 and along the bottom of the rear roof pillars. In FIG. 1, the line of cut is designated by the numeral 14 with respect to the windshield 12 and the left rear roof pillar cut is designated by the numeral 16 while the right rear roof pillar cut is designated by the numeral 18. The vehicle includes front wheel wells 20 and rear wheel wells 22. The front wheel wells 20 define the lateral limits of a transverse engine cradle designated generally by the numeral 21 which extends transversely across the front of the vehicle generally forwardly of windshield 12 and between the forward shock or strut towers 25, 27. A rear transverse shock and wheel support member extends transversely across the vehicle generally between the rear wheel wells and the pair of rear shock towers. The transverse shock and wheel support member extends generally rearwardly of the forward edge 24 of the rear wheel wells 22. Similarly, the front wheel wells 20 includes a rear edge portion 23. It should be understood that the floor pan 26 of vehicle 10 extends generally between the positions 23 and 24 or generally between front wheel well 20 and rear wheel well 22. Floor pan 26 is of a unibody construction for the vehicle conversion which is the subject of the present invention. The floor pan 26 provides generally limited structural integrity to the vehicle. In the hardtop form, the vehicle body includes a structural roof panel which carries roof beams extending longitudinally from the windshield and downwardly toward the vehicle body in the form of a rear left and right roof pillars. Thus, one skilled in the art will see that when the roof is removed from the vehicle substantial structural integrity is removed from the automobile body. Indeed, with the vehicle that is the subject of the conversion of the present invention, the area between positions 23 and 24 is generally unreinforced and does not have the usual automobile frame or chassis.

The method of the present invention first contemplates the positioning of a pair of longitudinal structural reinforcement beams 30, 32 which are square tubing (FIG. 5) or rectangular tubing in cross-section. The beams 30, 32 are positioned on the underside of the vehicle and therefore do not interfere with leg room of the passengers. Further, beams 30, 32 abut continuously the bottomside of the floor panel 26 and are connected at intervals thereto be means of welding, for example. In order to form the continuous connection between beams 30, 32 and floor panel 26, small openings can be cut in the floor panel 26 at a position which registers with the top surface 31, 33 of each beam 30, 32. Welding the peripheral edges of the floor pan openings then forms a connection between the unibody floor pan and the upper surfaces 31, 33 respectively of beams 30, 32. The forward end portions 34, 36 of beams 30, 32 form structural connections with the forward wheel well by means of curved plates 38, 39. Plates 38, 39 are shaped to register with the exterior surface of the forward wheel wells 20. Additionally, curved plates 38, 39 are structurally reinforced at their connection to beams 30, 32 with vertically standing channel beams 40, 42. The combination of the enlarged curved plates 38, 39 and the generally U-shaped in cross-section channel members 40, 42 provides a substantial anchor which conforms to the surface of each forward wheel well 20, to which the forward end portions 34, 36 of beams 30, 32 can attach by welding, for example. Stresses at the forward ends of beams 30, 32 are thus developed through the plates 38, 39 and vertical channels 40, 42 to the wheel wells. Triangular gusset plates 49 can be used to reinforce the connection between beams 30, 32 and channels 40, 42 respectively. The wheel wells are structurally reinforced interiorly by the engine cradle and forward shock towers 25, 27. In order to perfect the structural connection of each longitudinal beam 30, 32 with the engine cradle 21, the curved plates 38, 39 are continuously welded along their edges to the wheel well. The plates 38, 39 are positioned so that they attach to the vehicle unibody at a position adjacent the point of attachment of the engine cradle to the automobile unibody. However, the curved plates 38, 39 are preferably attached on the outside of the vehicle unibody while the engine cradle is attached on the inside of the vehicle unibody. This produces a layered reinforcement in the form of the engine cradle, the unibody shell of the vehicle, and the curved plates 38, 39.

At the rear wheel wells 22, 24, a diagonally upwardly extending beam portion 50 extends along the upper edge portion of the wheel well so as not to interfere with operation of the wheel or its supporting parts (including axles and struts). This diagonally and upwardly extending member 50 forms a structural connection with the rear transverse support that carries the wheel and shock assembly of the vehicle. In this manner, a structural reinforcement is formed between the rear end 52 of each longitudinal beam 30, 32 with the rear transverse member which carries the wheel and shock assembly.

A transverse support 60 having a generally U-shaped cross-section which is an inverted "U" in section spans between beams 30, 32 and attaches to the top portions thereof at 62, 64 respectively. The transverse member 60 includes a central elevated section 65 which accommodates any vehicle transmission hump that might be present.

A second transverse beam 68 (FIG. 2) extends transversely between opposite sides of the vehicle body and forms a connection with the left and right side portions of the vehicle. Connections using welding (such as designated by 69 in FIG. 2) form connections through the floor pan of the unibody with the underlying longitudinal beams 30, 32. In FIG. 2, the left door opening is designated generally by the numeral 70 while the numeral 72 designates the area normally occupied by the rear passenger seat. Thus, the rear left floor portion of the vehicle is being viewed.

Figure 4:
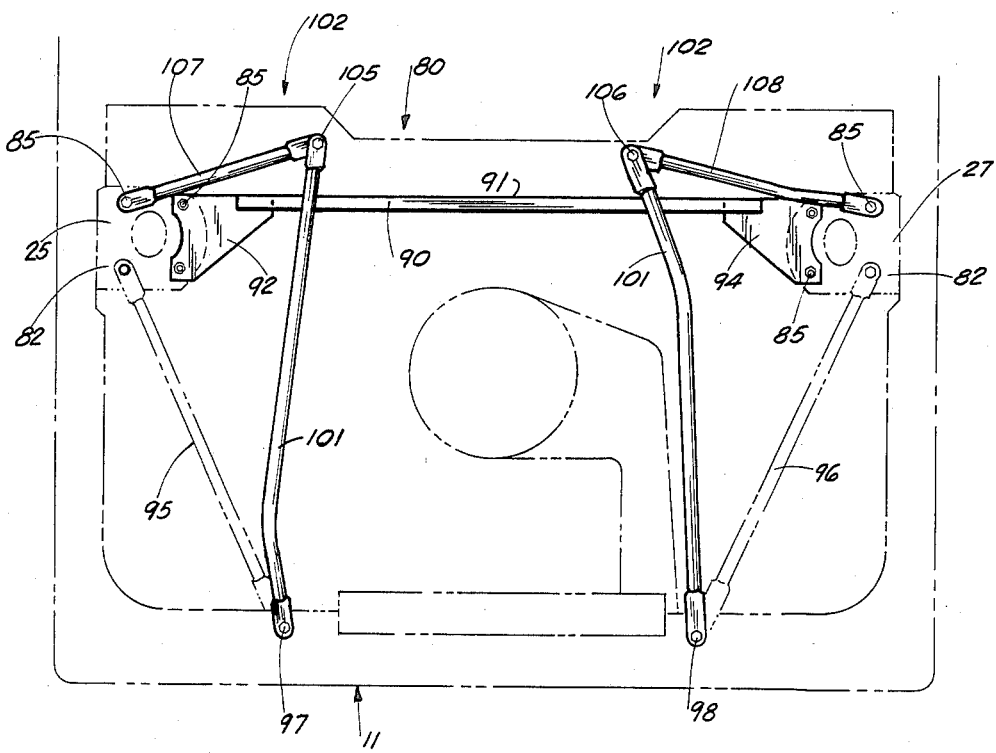
FIG. 4 is a top view of the preferred embodiment of the apparatus of the present invention illustrating the shock tower reinforcing beams.
Figure 5:
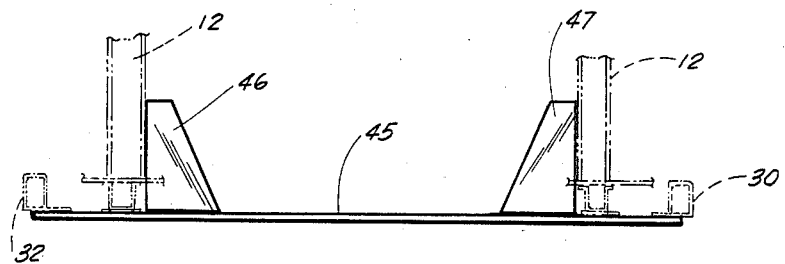
FIG. 5 is a sectional, elevational view of the preferred embodiment of the apparatus of the present invention illustrating the longitudinal beams, and facing aft from the engine compartment.
Figure 6:
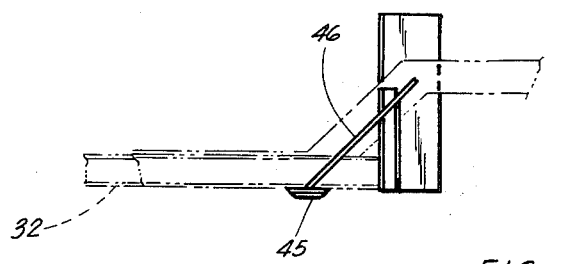
FIG. 6 is a side view of the preferred embodiment of the apparatus of the present invention illustrating the underbody conversion at the right side adjacent the fender well.

In FIGS. 4 and 5, a third transverse beam 45 is shown extending on the underside of the vehicle between the underside portions of longitudinal beams 30, 32. Forwardly extending gusset plates 46, 47 can additionally be used to tie the transverse beam 45 to the vehicle unibody 12.

In FIG. 4, the forward end portion 11 of the vehicle body 12 is illustrated with the hood removed to show the engine compartment which is designated generally by the numeral 80. Forward shock towers 25, 27 are seen in the view of FIG. 4 which is a plan view looking down on the engine compartment. The shock towers 25, 27 each provide a plurality of, for example, four bolts protruding through the upper surface 82 of each shock tower, the bolts being designated generally by the numerals 85 in FIG. 4. Extending transversely across the engine compartment is a transverse shock tower reinforcement beam 90 which includes a pair of spaced apart flanges 92, 94 each being generally triangular and having openings which register with the bolts 85 as shown in FIG. 4. The triangular flanges 92, 94 can, for example, be of any suitable structural material such as welded structural steel. The central portion of transverse beam 90 is an elongated member 91 of generally uniform cross-section which can be, for example, a structural tubing member. A pair of forwardly extending beams 95, 96 shown in FIG. 4 represent existing struts which are provided on the vehicle body already and connect generally the shock towers 25, 27 with the forward portion of the vehicle body 11 at positions 97, 98. A pair of longitudinally extending struts 100, 101 extend between the engine fire wall designated generally by the numeral 102 and the forward 11 portion of the vehicle body connecting at positions 97, 98 as shown in the drawings. At the fire wall area 102, struts 100, 101 can be bolted to the auto body, for example, at the positions 105, 106 using bolted connections. Rear diagonal struts 107, 108 extend diagonally between the positions 105, 106 and the shock towers 25, 27 so that the strut members 107, 108 can be attached to the bolted connection 85 provided at the shock towers 25, 27. The reinforcement of FIG. 4 provides stability to the entire engine compartment area so that front end vibrations, shimmy, and the like are removed substantially from the vehicle, thus providing a much better ride. The members 95, 96 and 107, 108 attach directly to the shock towers while the transverse beam 90 ties the shock towers together. Further, the members 100, 101 rigidify the engine compartment in a forward aft direction and tie in with the members as shown.

By rigidifying the engine compartment area and by reinforcing the shock towers 25, 27 themselves as shown in FIG. 4 and as more fully described hereinafter, the shock towers become structural load carrying members which transfer load from the engine compartment area down through wheel wells and then to the longitudinal beams 30, 32 as will be described more fully hereinafter with respect to FIGS. 5–8.

Figure 7:
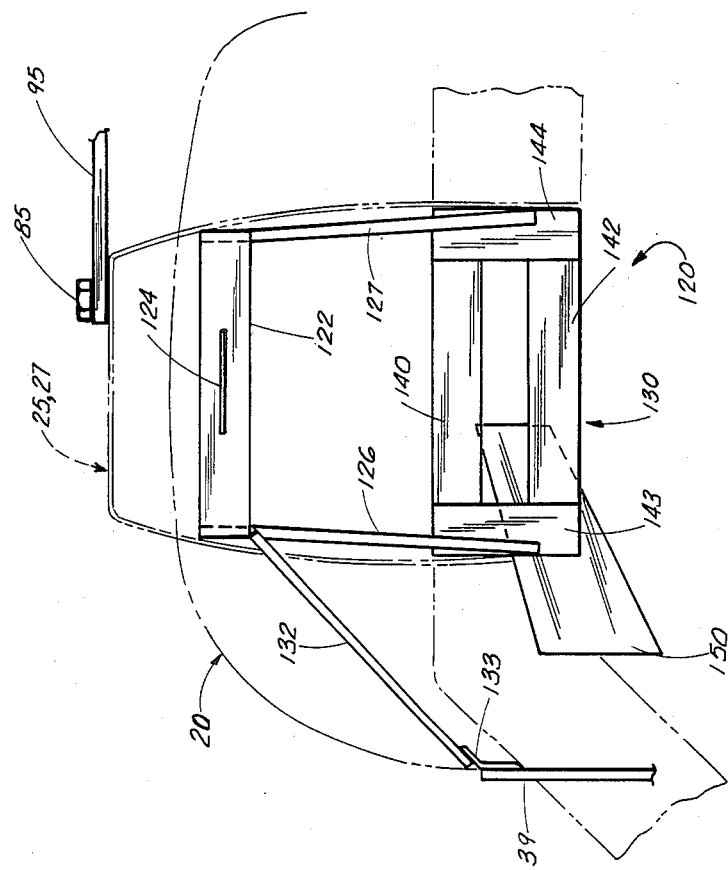
FIG. 7 is a fragmentary, side view of the wheel well truss portion.
Figure 8:
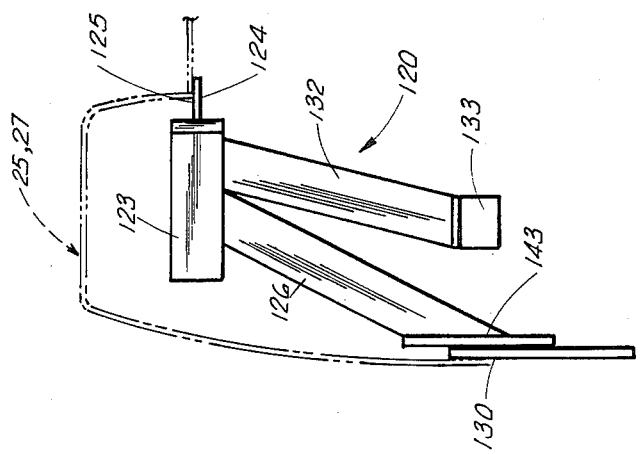
FIG. 8 is a fragmentary, front and sectional view of the wheel well truss portion.

In FIGS. 7 and 8, there can be seen a wheel well, shock tower truss designated generally by the numeral 120. Truss 120 connects to the assembly of curved plates 38, 39 and their respective vertical beams 40, 42 as shown in FIG. 1. Additionally, the truss 120 extends to the inside of shock towers 25, 27 (FIG. 8) further rigidifying and strengthening the shock towers 25, 27. Truss assembly 120 includes an upper shock tower reinforement that includes plates 121, 122 and 123 which intersect at generally right angles with respect to each other. Bracket 124 provides an attachment (FIG. 8) for welding the upper end portion of truss assembly 120 to shock towers 25, 27 at position 125 using welding, for example. Truss assembly 120 further includes a pair of downwardly and diagonally extending members 126, 127 which connect with truss lower section 130 (FIG. 8). A laterally and diagonally extending member 132 (FIGS. 7, 8) extends between the plate 123 and the top of curved plates 38, 39 respectively. Thus, a structural connection is formed between truss assembly 120 and a combination of curved plate 38 or curved plate 39, as the case may be, and its associated vertical plate 40, 42.

The effect of this connection is that the vehicle provides structural reinforcement between each forward shock tower 25, 27, through the truss assembly 120 and then directly to the longitudinal beams 30, 32. This provides a very sound structural reinforcement to the vehicle body fore and aft.

An angle iron 133 or like connector plate can be used to form the connection between member 132 and curved plate 38 or 39. Lower truss section 130 includes a pair of horizontally spaced apart plates 140, 142 connected vertically by plates 143, 144, all of which are structural steel, for example, and of welded construction. Gusset plate 150 connects between the lower section 130 of truss member 120 and front wheel well 20 of vehicle body 12. Plate 150 can be continuously attached to the wheel well 20 by welding, for example, and can be tied to the forward portion of each curved plate 38, 39.

In FIG. 3, the rear seat of vehicle body 12 can be formed using a plurality of upstanding plate members 155 which are attached to a transverse plate member 160. A space 170 would thus be provided behind the rear seat defined by members 155 and 160 for the placement of a hydraulically operated soft top, for example.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

What is claimed as invention is:

1. A method of converting a sedan hardtop vehicle body to a soft fabric top vehicle automobile body comprising the steps of:
    a. providing a sedan vehicle body to be converted that is of unibody construction and which includes a hardtop continuous roof panel supported by front and rear roof pillars, a forward windshield, a forward structural engine cradle and a rear transverse wheel support spaced longitudinally therefrom, and connected below by a floor pan and with forward and rear wheel wells respectively adjacent the forward engine cradle and rear transverse wheel support;
    b. severing the continuous hardtop roof panel from the vehicle body by forming cuts along the front of the continuous roof panel at the vehicle windshield and along the bottom of the rear roof pillars;
    c. forming a pair of longitudinal structural reinforcements to the vehicle body with beams that connect structurally between the engine cradle and the rear transverse support areas of the vehicle body by connecting the ends of the beams respectively to the front and rear wheel wells and generally along the respective left and right sides of the automobile body, and underneath the vehicle body floor pan;
    d. developing a connection between each longitudinal beam and the wheel well at each end portion of each respective beam using plates that extend upwardly along and are connected to the respective wheel well so as not to interfere with operation of the wheel or wheel supports.
    e. forming a transverse structural reinforcement to the vehicle unibody on the upper surface of the automobile floor pan that extends transversely between and fastens to the longitudinal reinforcements; and f. replacing the cutaway continuous roof panel with a folding, fabric-like top.

2. The method of claim 1 wherein the pair of longitudinal reinforcement beams extend diagonally above the respective vehicle rear wheel wells to form a connection with the rear transverse support adjacent the wheel wells on each respective side of the vehicle.

3. The method of claim 1 further comprising the step of attaching a pair of reinforcing plate members respectively inside the front wheel wells of the vehicle body and attaching the forward end portions of the longitudinal reinforcing beams thereto.

4. The method of claim 1 wherein in step "b" and "c," one end portion of each longitudinal structural reinforcement beam forms a connection with the rear transverse support member at a position above the plane defined by the floor pan of the automobile body.

5. The method of claim 1 wherein step "c," each longitudinal reinforcement beam is connected by welding to the floor pan at intervals along the length of the floor pan.

6. The method of claim 1 wherein in step "c," the forward end portions of each longitudinal, structural reinforcement beam is anchored by welding to the forward wheel well lining of the vehicle.

7. The method of claim 1 further comprising the step between steps "c" and "c" of attaching curved plates to the interior of each forward wheel well and the additional step of anchoring the forward end portion of each structural reinforcement beam to the respective curved plates.

8. The method of claim 1 further comprising the step between steps "c" and "c" of anchoring the rear end portions of the longitudinal, structural reinforcement beams respectively to the rear transverse support at a position above the longitudinal axis of each beam.

9. The method of claim 1 wherein there is further provided the step between steps "b" and "c" of anchoring the rear end portion of each longitudinal, structural reinforcement beam to the rear wheel well by welding.

* * * * *